(12) United States Patent
Richardson (10) Patent No.: US 8,536,499 B2
(45) Date of Patent: Sep. 17, 2013

(54) POWER SUPPLY FOR RADIO FREQUENCY HEATING APPARATUS

(75) Inventor: Robert Richardson, Chelmsford (GB)

(73) Assignee: E2V Technologies (UK) Limited, Chelmsford (GB)

(*) Notice: Subject to any disclaimer, the term of this patent is extended or adjusted under 35 U.S.C. 154(b) by 549 days.

(21) Appl. No.: 12/663,615

(22) PCT Filed: May 30, 2008

(86) PCT No.: PCT/GB2008/050379
§ 371 (c)(1),
(2), (4) Date: Mar. 9, 2010

(87) PCT Pub. No.: WO2008/149133
PCT Pub. Date: Dec. 11, 2008

(65) Prior Publication Data
US 2010/0181307 A1    Jul. 22, 2010

(30) Foreign Application Priority Data
Jun. 8, 2007    (GB) .................................. 0711094.3

(51) Int. Cl.
*H05B 6/68*    (2006.01)

(52) U.S. Cl.
USPC ........................... 219/717; 219/718; 323/207

(58) Field of Classification Search
USPC .................. 219/717, 718; 323/207
See application file for complete search history.

(56) References Cited

U.S. PATENT DOCUMENTS

| | | | | |
|---|---|---|---|---|
| 3,792,369 | A * | 2/1974 | Levinson | 331/71 |
| 5,171,948 | A * | 12/1992 | Ishii | 219/717 |
| 6,876,158 | B2 * | 4/2005 | Trostl et al. | 315/291 |

FOREIGN PATENT DOCUMENTS

| | | |
|---|---|---|
| EP | 1404158 A | 3/2004 |
| EP | 1408720 A | 4/2004 |
| EP | 1734791 A | 12/2006 |
| JP | 55-11010 | 1/1980 |
| JP | 62-190692 | 8/1987 |

(Continued)

OTHER PUBLICATIONS

International Search Report of PCT/GB2008/050379 Filed Dec. 8, 2008.

(Continued)

*Primary Examiner* — Tom Thomas
*Assistant Examiner* — Benjamin Tzu-Hung Liu
(74) *Attorney, Agent, or Firm* — Venable LLP; Robert Kinberg (57) ABSTRACT

An RF generator power supply comprises a first switched mode power supply (SMPS) connected in series to a second SMPS by a DC bus. A capacitor is arranged between the outputs of the first SMPS and inputs of the second SMPS to act as a smoothing capacitor for the first SMPS and to supply pulse energy to the second SMPS. The second SMPS has an output connected to an input of a step-up transformer and an output of the step-up transformer is connected to an input of a rectifier connectable to the RF generator. An input of the first SMPS is connectable to a prime power supply to maintain a high power factor with low harmonic content while setting an operating voltage and peak current level for the RF generator. The second SMPS is arranged to feed the step-up transformer and is arranged to operate with a variable duty cycle and/or variable frequency to provide average power control of the RF generator. The second SMPS is rapidly switched off on detection of a power surge through the RF generator.

12 Claims, 9 Drawing Sheets

(56) References Cited

FOREIGN PATENT DOCUMENTS

| JP | 04-087185 | | | 3/1992 |
| JP | 04087185 | A | * | 3/1992 |
| JP | 06-215868 | | | 8/1994 |
| JP | 06215868 | A | * | 8/1994 |
| JP | 10-070832 | | | 4/1997 |
| WO | WO-9500744 | A1 | | 1/1995 |

OTHER PUBLICATIONS

International Preliminary Report on Patentability (PCT/IB/373) with Written Opinion.
English Translation of Office Action issued in Japanese Application No. 2010-510881, dated Jun. 17, 2013.

* cited by examiner

Figure 5     SMPS2 P1-P2 output waveform diagram

Figure 7

SMPS2 response to and recovery from load arc

POWER SUPPLY FOR RADIO FREQUENCY HEATING APPARATUS

CROSS-REFERENCE TO RELATED APPLICATIONS

This application is derived from PCT application number PCT/GB2008/050379 filed May 27, 2008 and claims priority from GB 0711094.3 filed Jun. 8, 2007.

FIELD OF THE INVENTION

This invention relates to a power supply for radio frequency heating apparatus.

BACKGROUND OF THE INVENTION

The term "RF energy" is used herein for electromagnetic energy in any part of the spectrum from LF to microwaves inclusive.

Applying RF energy to materials to produce heat, or some other desired effect, is a well-known technique used in both domestic and industrial processes.

Figure 1:
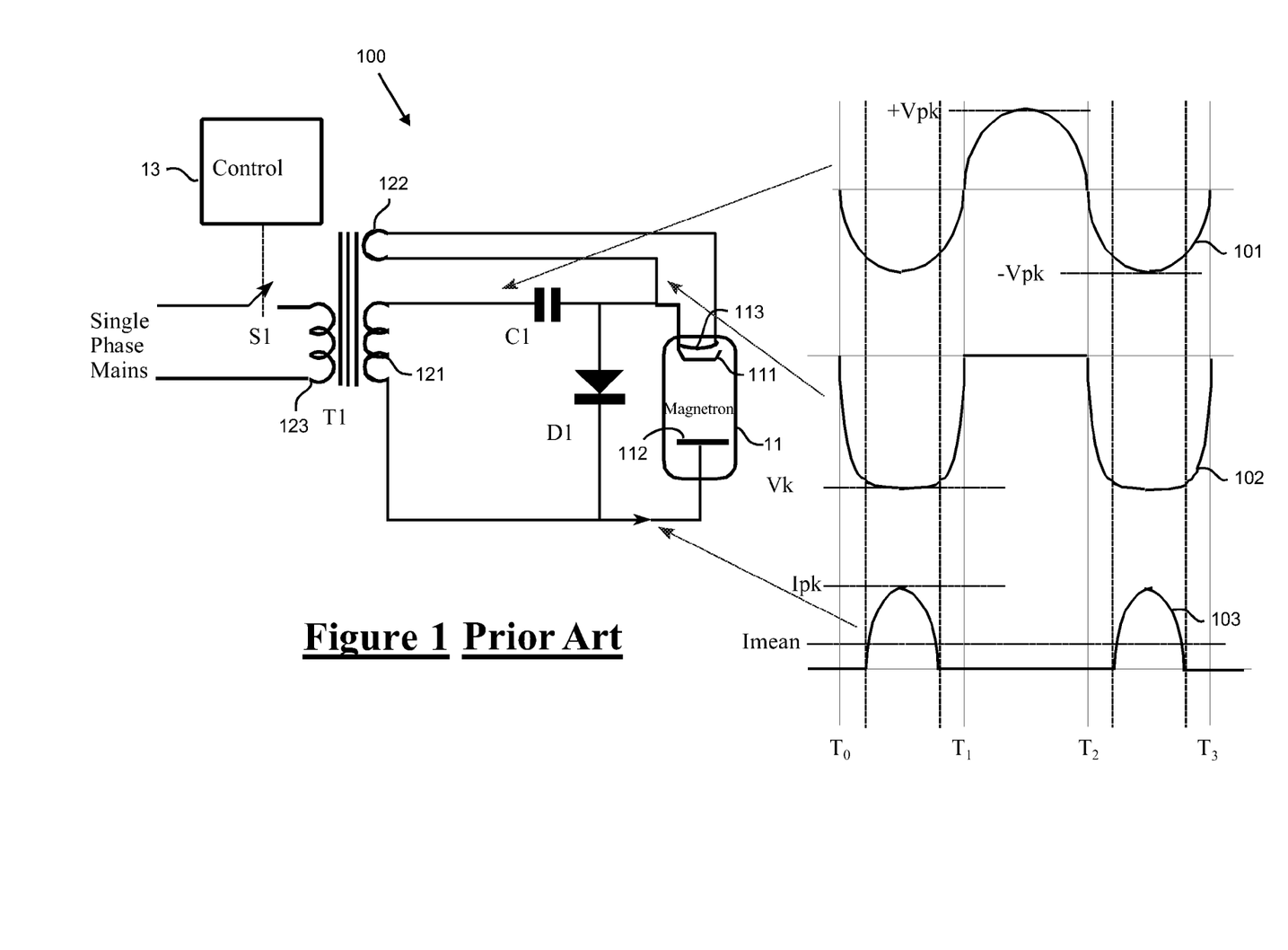
FIG. 1 is a circuit diagram of a known low-power magnetron system.

FIG. 1 shows a typical arrangement of a well-known domestic microwave oven 100, which comprises a microwave generator. In a microwave oven 100, a magnetron 11 is powered through a transformer T1, a first end of a secondary winding 121 of the transformer T1 being connected via a capacitor C1 to a cathode 111 of the magnetron 11 and a second end of the secondary winding 121 of the transformer T1 being connected to an anode 112 of the magnetron 11. The magnetron anode 112 is usually grounded. A diode D1 is connected between the cathode and anode of the magnetron 11. A single phase mains voltage is applied through a switch S1 to a primary winding 123 of the transformer T1. On a positive half cycle of a single phase main supply, between times $T_1$ and $T_2$ on a first voltage plot 101 of FIG. 1, capacitor C1 charges up to +Vpk, substantially equal to a maximum positive voltage output from the secondary winding of transformer T1. On a negative half cycle of the single phase mains supply, between times $T_0$ and $T_1$, and between times $T_2$ and $T_3$ in plot 102 of FIG. 1, the capacitor voltage on C1 and a negative voltage from the secondary winding, having a maximum value −Vpk, are added to provide a variable voltage with a maximum value of −Vk and this results in a variable current flow into the magnetron, shown in plot 103, with a maximum value of Ipk and an average value Imean. The variable current is a clipped half sine wave and usually has a peak current Ipk to mean current Imean ratio of approximately three.

Transformer T1 usually incorporates a non-linear leakage reactance to provide a current shaping facility and a degree of regulation against mains voltage variations. A second secondary winding 122 is also usually provided in the transformer T1, to supply a magnetron heater 113, as shown in FIG. 1.

Power control of the RF generator is usually effected by closing switch S1 using a control system 13 connected thereto, typically by switching power on for a period of several seconds followed by switching power off for several seconds in repeated cycles.

Systems in this basic form are well known and behave satisfactorily for moderate powers, typically of up to 1.5 kW average electrical input with the magnetron delivering a pulse of RF power with a peak value of 3 kW and an average value 1 kW.

Figure 2:
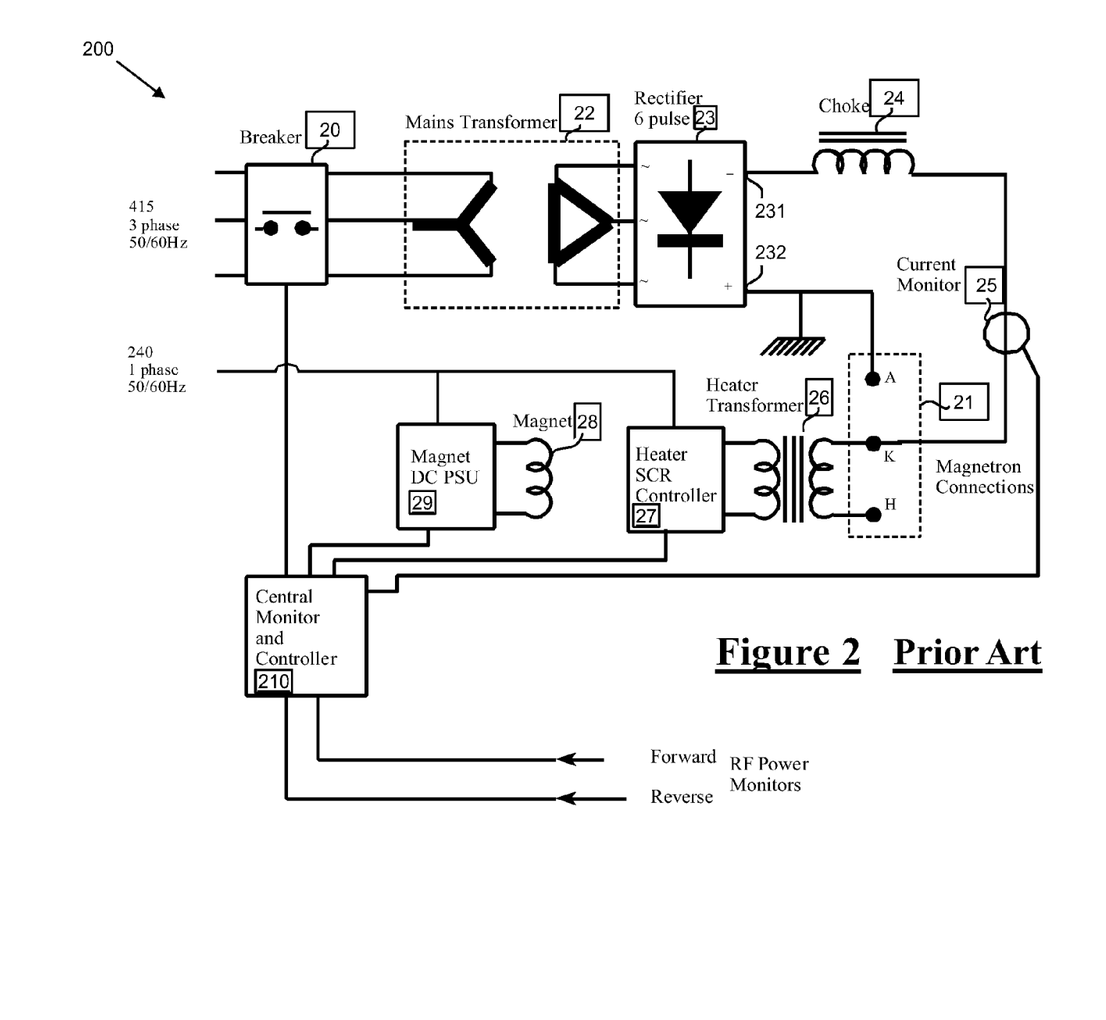
FIG. 2 is a circuit diagram of a known high-power magnetron system.

For very high powers, for example 50 kW average power, it is normal to use a three phase mains supply as a prime power source. An example of such a typical known high-power system 200 is shown in FIG. 2. A three phase mains supply is input via a breaker 20 to a mains transformer 22 and output to a 6 pulse rectifier 23. This arrangement produces a relatively smooth voltage with low ripple. However, as a magnetron 21 has a biased diode type of load, a small change in voltage due to a ripple voltage produces a much larger change in current. To produce steady current in the magnetron 21 a large choke 24 is used as a filter between a first output 231 of the 6 pulse rectifier 23 and a cathode K of the magnetron 21.

A starting voltage of the magnetron 21 is a function of a magnetic field strength applied thereto. By varying a magnetic field, the magnetron operating voltage can be raised or lowered, thus a power demand of the magnetron can be varied without any main power supply control features. The magnetic field is varied using a controllable power supply, such as an SCR controller 29, to vary a current supplied to a solenoid 28 arranged to apply the magnetic field to the magnetron 21. With high power magnetrons it is also usual to vary a voltage applied to a heater H of the magnetron 21, to optimise a temperature of the cathode K and this is carried out by a heater SCR controller 27 operating on a primary winding of a heater transformer 26, a secondary winding of the heater transformer being connected between the cathode K and the heater H of the magnetron 21.

With both the previously described standard known systems a number of variations are possible. For example, use of a single switched mode power supply (SMPS) is known in both low-power and high-power applications.

A disadvantage with the known arrangements is that should such an RF generator spark internally, a quantity of energy that can pass through the spark into the RF generator device is quite considerable and the risk of damage to the tube 11, 21 is high. Neither circuit is well suited to the rapid interruption of, or restoration of, power to the RF generator. This is because of a slow response of a contactor 51, 20 in interrupting power, and stored energy in a filter 24 and smoothing components associated with the rectification process.

A single switched mode power supply achieves ripple reduction with much smaller stored energy in the filters but the energy may still be significant and shutting down the system and restarting may still take several seconds thus resulting in an undesirable interruption of a process using the RF generator.

Most RF generators, and particularly magnetrons, produce optimum conversion of electrical energy to RF output energy over a small operating range of current and voltage. Thus a method of power control that maintains the RF generator at its optimum efficiency but still permits wide-ranging average power control to be obtained is desirable.

It is desirable that the power demand from the electrical utility is of good quality. The most desirable power factor is 1. This implies a load drawing power has characteristics of a linear resistor. With rectifiers, loosely described as any device that converts AC to DC, harmonic distortion of the mains is a well understood side effect and a gradually increasing problem for power utilities as a larger percentage of power is taken by electronic devices that result in a high harmonic content of the power supply. As an example, a commonly used 6 pulse 3 phase rectifier has a power factor of around 0.95 but produces around 25% harmonic distortion in the mains supply. A properly designed SMPS would have a power factor of 0.99 and additional harmonic distortion of the mains may be only 1% or 2%. A power supply for an RF generator thus requires a very good power factor (>0.98) and very low harmonic distortion, preferably of less than 4%. System 100, illustrated in FIG. 1, can be quite acceptable but could be improved. The high-power system 200 of FIG. 2 leaves a lot to be desired and under many situations does not meet regulatory requirements.

The system 100 of FIG. 1 provides pulses of energy but only as a by-product of its method of operation. A system that could provide RF energy input of an average power (Pave) but with a specified peak power (Ppk) can bring added benefits to a given process.

It is an object of the present invention at least to ameliorate the aforesaid disadvantages in the prior art.

SUMMARY OF THE INVENTION

According to the invention there is provided a power supply for an RF generator, the power supply comprising: first switched mode power supply (SMPS) means, and second SMPS means connected in series to the first SMPS means by DC bus means with capacitor means connected between outputs of the first SMPS means and between inputs of the second SMPS means, the outputs of the second SMPS means being connected to an input of step-up transformer means, an output of the step-up transformer means being connected to an input of rectifier means and an output of the rectifier means being connectable to the RF generator means, wherein an input of the first SMPS is connectable to a prime power input to set an operating voltage and peak current level for the RF generator and the second SMPS is arranged to feed the step-up transformer means and to operate with a variable duty cycle and/or variable frequency to provide average power control of the RF generator.

Advantageously, an output of the rectifier means is connected to the RF generator means without filtering means or smoothing means therebetween so that minimal energy is stored by the power supply such that the second SMPS can be rapidly switched off.

Preferably, the second SMPS can be switched off in less than two microseconds.

Conveniently, the power supply further comprises control means arranged to monitor a current passing through the RF generator and to control the first and second SMPS means.

Advantageously, the power supply has a power factor of at least 0.98.

Advantageously, the power supply is arranged to result in harmonic distortion of the prime power input of less than 4%.

Conveniently, the power supply is arranged to supply a magnetron RF generator and comprises heater supply means for powering a heater of the magnetron, wherein the control means is arranged to control the heater supply means.

Advantageously, the control means is arranged to switch off the second SMPS means on detection by the control means of a power surge through the RF generator and subsequently to switch on the second SMPS means.

Conveniently, the control means is provided with amplitude control means and duty cycle control means.

Conveniently, the power supply further comprises magnetic field generation means for applying a magnetic field to the RF generator wherein the control means is arranged to control the magnetic field generation means.

Advantageously, the power supply further comprises contactor means for switching the prime power input to the first SMPS, wherein the contactor means is arranged to be controlled by the control means.

Conveniently, the power supply is arranged for a three-phase prime power input.

Advantageously, the power supply is arranged to operate with a peak to mean power ratio in a range of 1 to 100.

BRIEF DESCRIPTION OF THE DRAWINGS

The invention will now be described, by way of example, with reference to the accompanying drawings in which:

FIGS. 3($a$1) to 3($c$2) are a series of plots, helpful in understanding applications of the invention, showing the effect on variations of temperature of a material of irradiating the material with different pulse duty cycles of RF radiation;

FIG. 4$a$ is a circuit diagram of a power supply according to the invention for a high-power RF generator;

FIG. 4$b$ is a circuit diagram of a power supply according to the invention for a low-power RF generator;

In the Figures, like reference numbers denote like parts.

DETAILED DESCRIPTION

Figure 3:
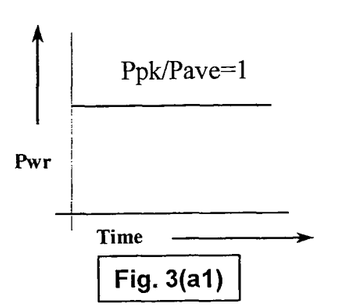

Referring to FIG. 3($a$1), if power Pave is fed into a material, a temperature of the material will initially rise as shown in FIG. 3($a$2) until equilibrium is reached and a peak temperature Tmax of the material will be the same as a steady state Tmean.

If power is input as shown in FIG. 3($b$1) in the form of pulses of magnitude Ppk where the duty cycle is high, as in the system 100 illustrated in FIG. 1, then some small temperature ripple may occur but once equilibrium is reached a maximum temperature Tmax will be substantially the same as an average temperature Tmean, as shown in FIG. 3($b$2).

Referring to FIG. 3 ($c$1), if, however, a power supply system provides a very low duty cycle so that a peak power Ppk is much greater than an average power Pave, for example a 100 times greater as shown in FIG. 3($c$1), a temperature in the material can undergo significant thermal cycling, following the power supply duty cycle. In this case, as shown in FIG. 3($c$2), a maximum temperature Tmax can be much higher than an average temperature Tmean and the rapid change in temperature during the thermal pulse (dt) may well introduce further desirable effects in the material being irradiated.

In a number of circumstances delivery of a required average power in the form of high peak power, low duty cycle pulses can have significant process benefits. Using RF power as a source, which has specific characteristics of power coupling to materials, very useful effects can be produced. These include, but are not limited to:

- localised thermal shock that weakens material, making subsequent processes such as cutting and grinding much easier to implement;
- initiation of chemical reactions; and
- destruction of bacteria without causing damage to a main body of material.

Figure 4A:
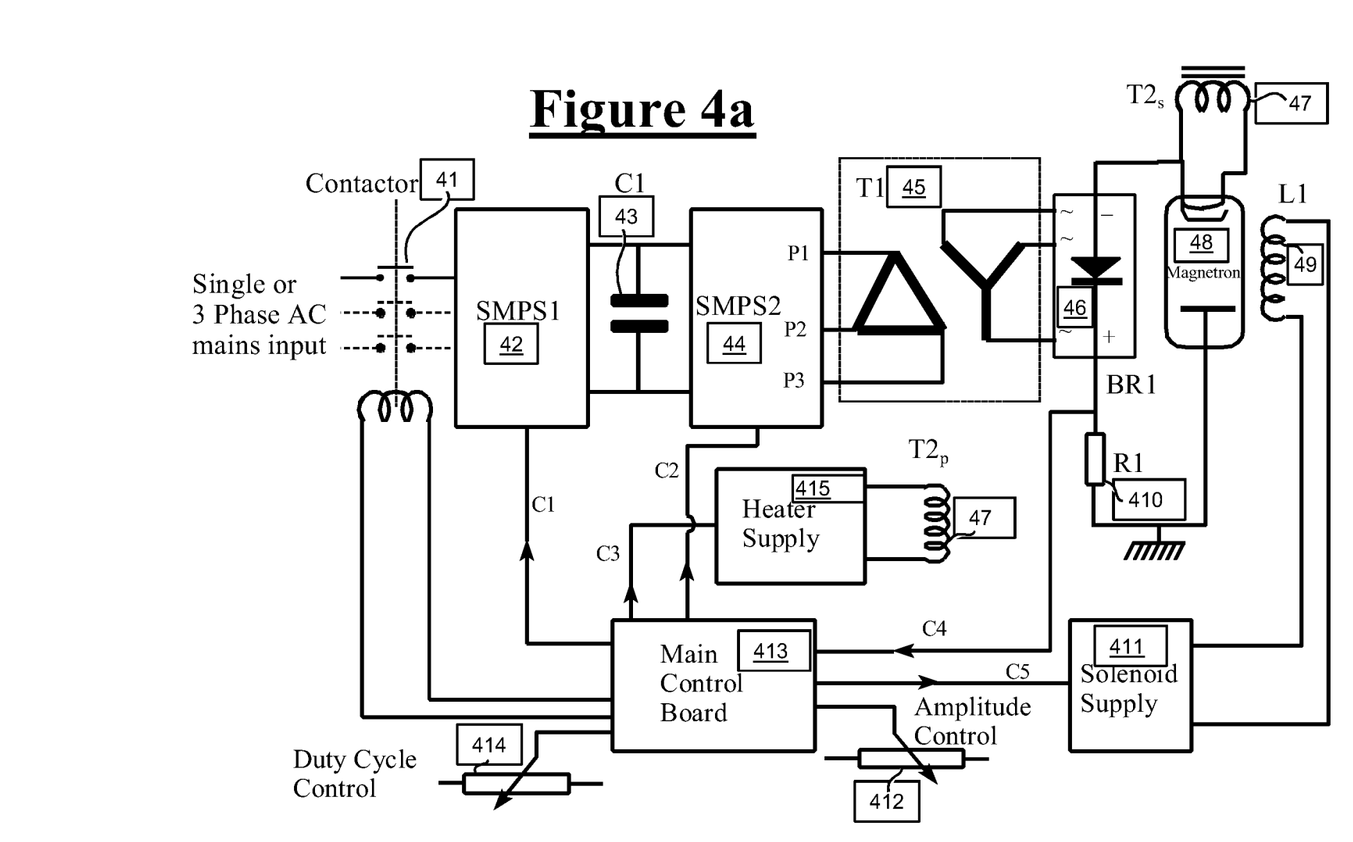

Referring to FIG. 4$a$, in a magnetron power supply according to the invention, a first switched mode power supply (SMPS1) 42 interfaces with a mains prime power via a contactor 41. A DC output from the first switched mode power supply 42 is input to a second switched mode power supply (SMPS2) 44. A C1 capacitor 43 is connected across the DC output of SMPS1 42 and the DC input of SMPS2 44.

The second switched mode power supply (SMPS2) 44 has three outputs P1, P2 and P3 and operates as a DC to 3-Phase AC converter with an output to a T1 transformer 45 which has an output to a BR1 rectifier 46 such that a voltage transformation by T1 transformer 45 and BR1 rectifier 46 matches a required voltage of a magnetron 48 at an optimum operating current. A voltage of the DC output of the SMPS1 first switched mode power supply 42 is controlled by a main control board 413 to give this required voltage at the magnetron 48.

A current through the magnetron 48 is monitored by an R1 resistor 410 between a positive voltage output of the rectifier 46 and an anode of the magnetron 48. An operating voltage of the magnetron 48 can be set to a predetermined value by setting a current through a solenoid 49 which is controlled by a solenoid supply 411 to set a magnetic field which is applied to the magnetron 48. Over a usual range of operation the magnetron voltage is virtually directly proportional to the solenoid current.

The main control board 413 has a signal input from the R1 resistor 410 via a control line c4 and an output for a control signal for SMPS1 42 on a control line c1 and for the solenoid supply 411 on a control line c5. All these functions can be controlled by an amplitude control module 412 with an input to the main control board 413, that permits the required magnetron voltage and current to be set with a single control, so that the magnetron peak voltage and current and thus the RF power peak value is set thereby for the system.

SMPS2 44 is designed to produce a transformer-compatible 3-phase nominally rectangular pulse drive waveform that can be used to vary the average magnetron current by pulse width modulation techniques. Types of waveform generated are shown in FIG. 5 and FIG. 6.

Figure 5:
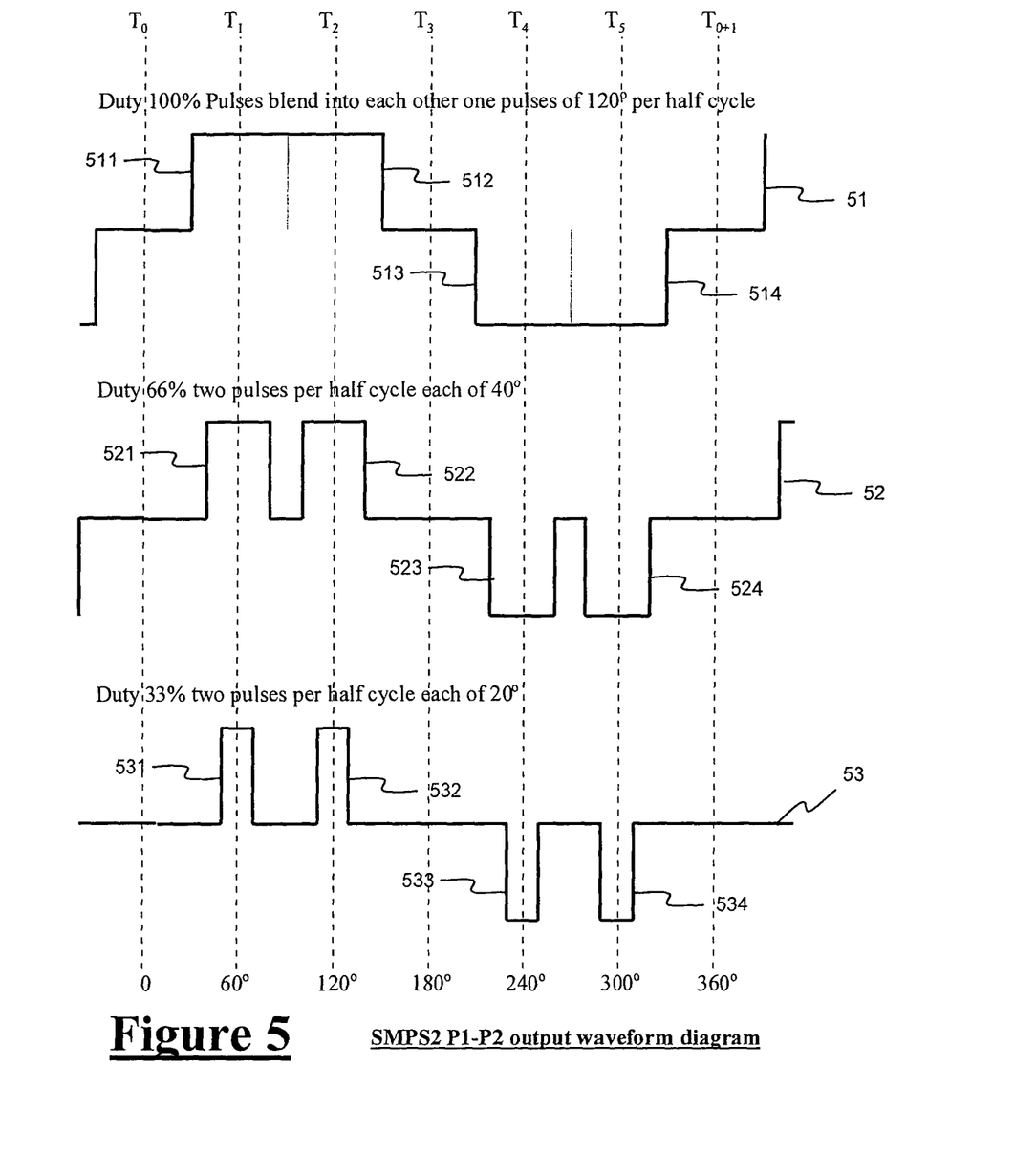
FIG. 5 shows traces of waveforms generated between two output ports of a second SMPS of the circuit of FIG. 4$a$ for different duty cycles.

FIG. 5 shows waveforms between P1 and P2 outputs of the SMPS2 44 of the embodiment of FIG. 4a. For 100% pulses the generated waveform 51 provides for two pulses 511, 512 per half cycle centred on 60° and 120° in each half cycle at times T1 and T2 for the positive half cycle and pulses 513, 514, at times T4 and T5 for the negative half cycle. Examples of waveforms 52 and 53 for reduced duty cycles to 66% and 33% respectively are also shown in FIG. 5. To achieve very low duty cycles one pulse on each half cycle at T2 and T5 can be switched off. Increasing the periodic time of the waveform ($T_0$ to $T_{0+1}$) will further reduce the duty cycle. The pulse width should remain the same as at the maximum duty cycle level to avoid saturation effects in T1 transformer 45.

Figure 6:
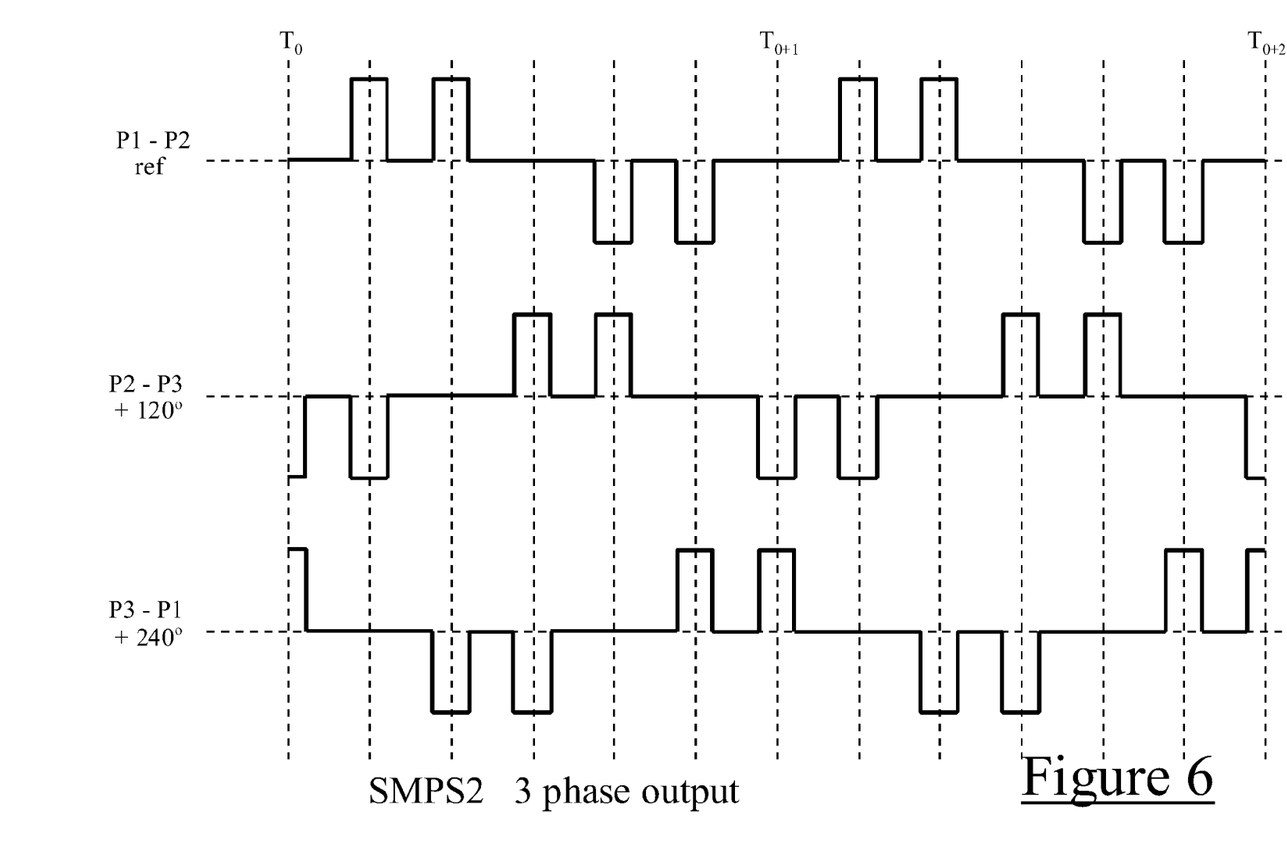
FIG. 6 shows traces of waveforms generated between different combinations of ports of three-phase output from the second SMPS.

FIG. 6 shows the basic phase relationship between combinations of the three 3-phase outputs P1, P2 and P3 of SMPS2 44 of the embodiment of FIG. 4a, showing the three phase output.

Referring again to FIG. 4a, an anode current is monitored by R1 resistor 410 and a signal is input via control line c4 to the main control board 413 and an output signal is output to SMPS2 44 via control line c2. Varying the duty cycle of the SMPS2 varies the pulse duty output, and thus the average power from SMPS2. A duty cycle control 414 input to the main control board 413 permits a required duty cycle to be set. Magnetrons, as distinct from at least some other generators of microwave power, require the heater voltage to be reduced as the average power increases. The main control board 413 also performs this function by outputting a control signal on control line c3 to control the heater supply 415 having an output to a heater T2 transformer 47 electrically coupled to a heater of the magnetron 48.

Figure 7:
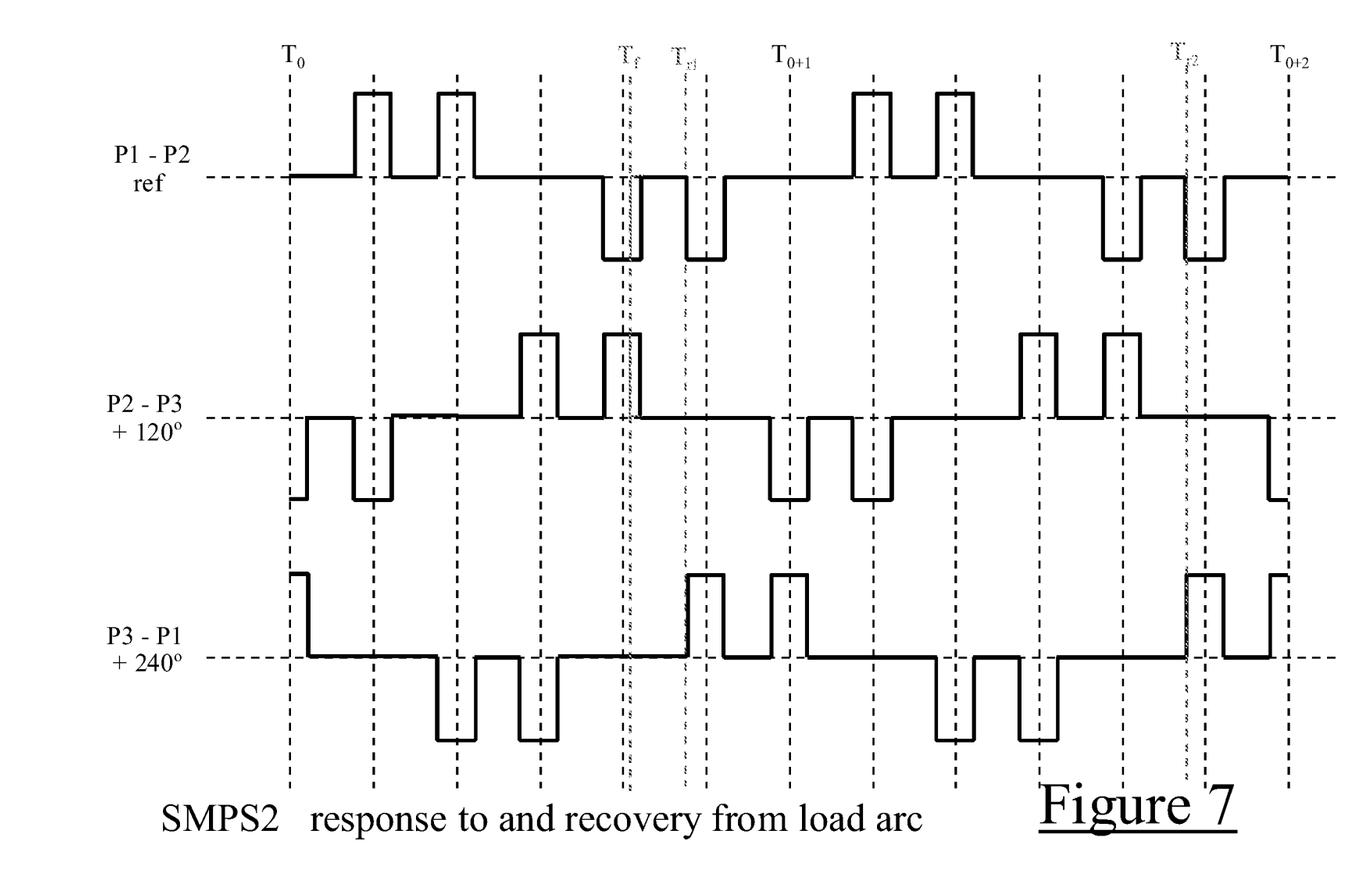
FIG. 7 shows traces of waveforms generated between different combinations of ports of three-phase output from the second SMPS, showing recovery from arcing of a magnetron using a power supply according to the invention.

In the event of a load fault, which is detected as a sharp increase in current as monitored by R1 resistor 410, the output of SMPS2 44 is arranged to be immediately turned off by the main control board 413. FIG. 7 shows the effect of this with a fault occurring at $T_f$ in that the pulses in which the fault occurs are immediately terminated as shown by the solid lines at time $T_f$. This process can occur within a time period as short as 1 to 2 μsec. The rapid termination of the pulse and the fact that no filtering components are used on the rectified output from BR1 46 ensure that energy transmitted through the magnetron 48 by the fault is very low and produces no damaging effects in the magnetron. Restoration of normal operation can be attempted on what would have been the next pulse $Tr_1$ if required. Alternatively, a small delay $Tr_2$ may elapse to restart in a same position in a duty cycle and/or restarting at a lower peak or average power can be attempted. Restarting at a same position in a duty cycle ensures that a phase relationship is maintained to avoid transformer saturation. Both these options permit a far more rapid re-instatement of power than any established method. They also permit a linking of fault recovery to the final process is such a way that process operation is not significantly interrupted.

The T1 transformer 45 is preferably designed in a manner typical for high frequency transformers that feed rectifiers. As well as the usual transformer design requirements for low figures of core and copper loss, low leakage inductance is also a desirable feature.

For a high-power system a typical set of values for an application are C1 voltage 800V for a magnetron operating at 20 kV at 4 A peak for 65 to 70 kW of peak RF output. The duty cycle is 50% for 35 kW average output power. Operating frequency for SMPS1 and SMPS2 is 4,000 pps.

Figure 4B:
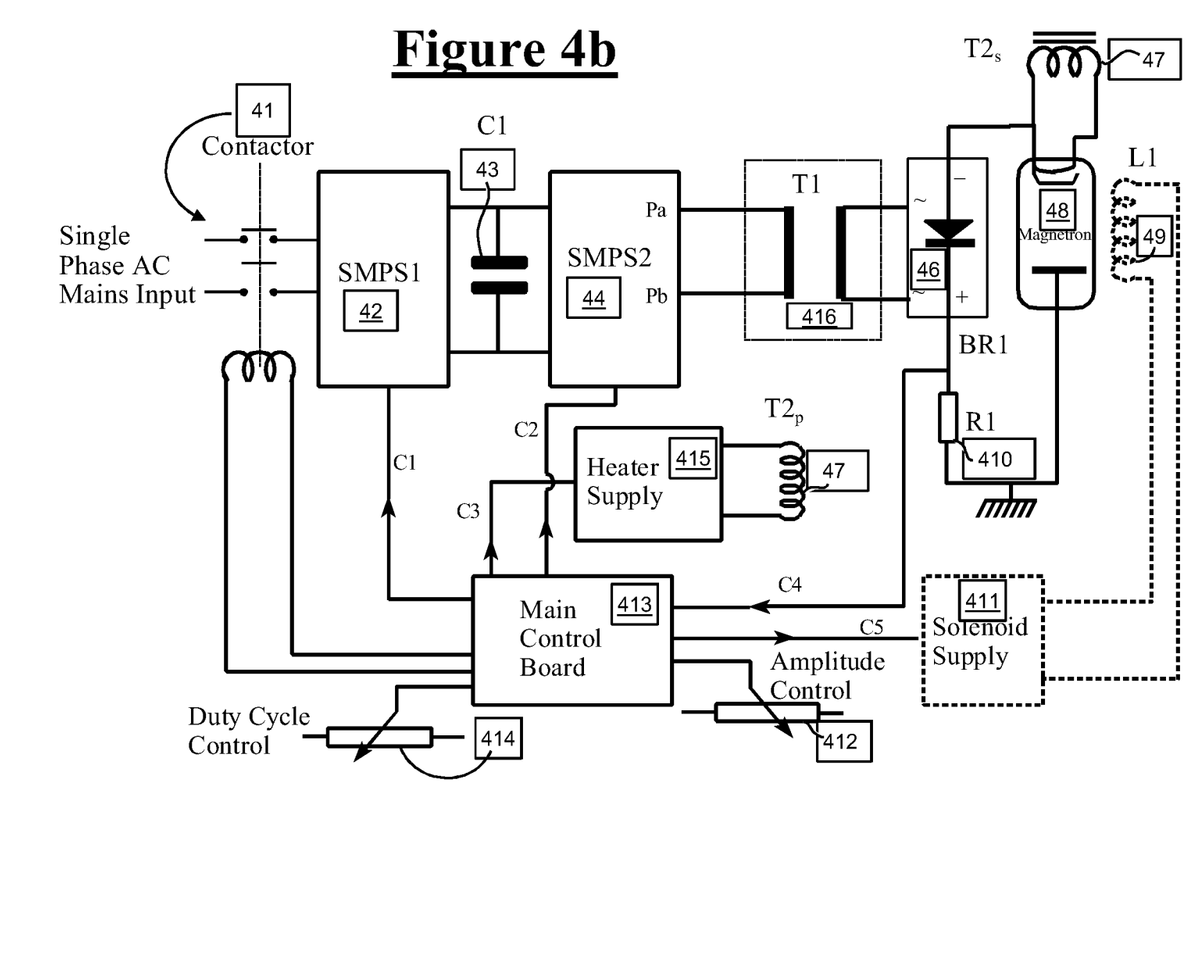

FIG. 4b shows a low-power embodiment of the invention again comprising two switched mode power supplies (SMPS1 and SMPS2) in series. This embodiment requires only a single phase mains input to SMPS1 42 and SMPS2 44 outputs a single phase rectangular pulse waveform. Smaller magnetrons frequently use a permanent magnet on the magnetron 48 in which case an L1 solenoid 49 and its attendant power supply 411 are not required. In all other regards the operating principle is the same as for the higher power system as described in respect of FIG. 4a.

Figure 8:
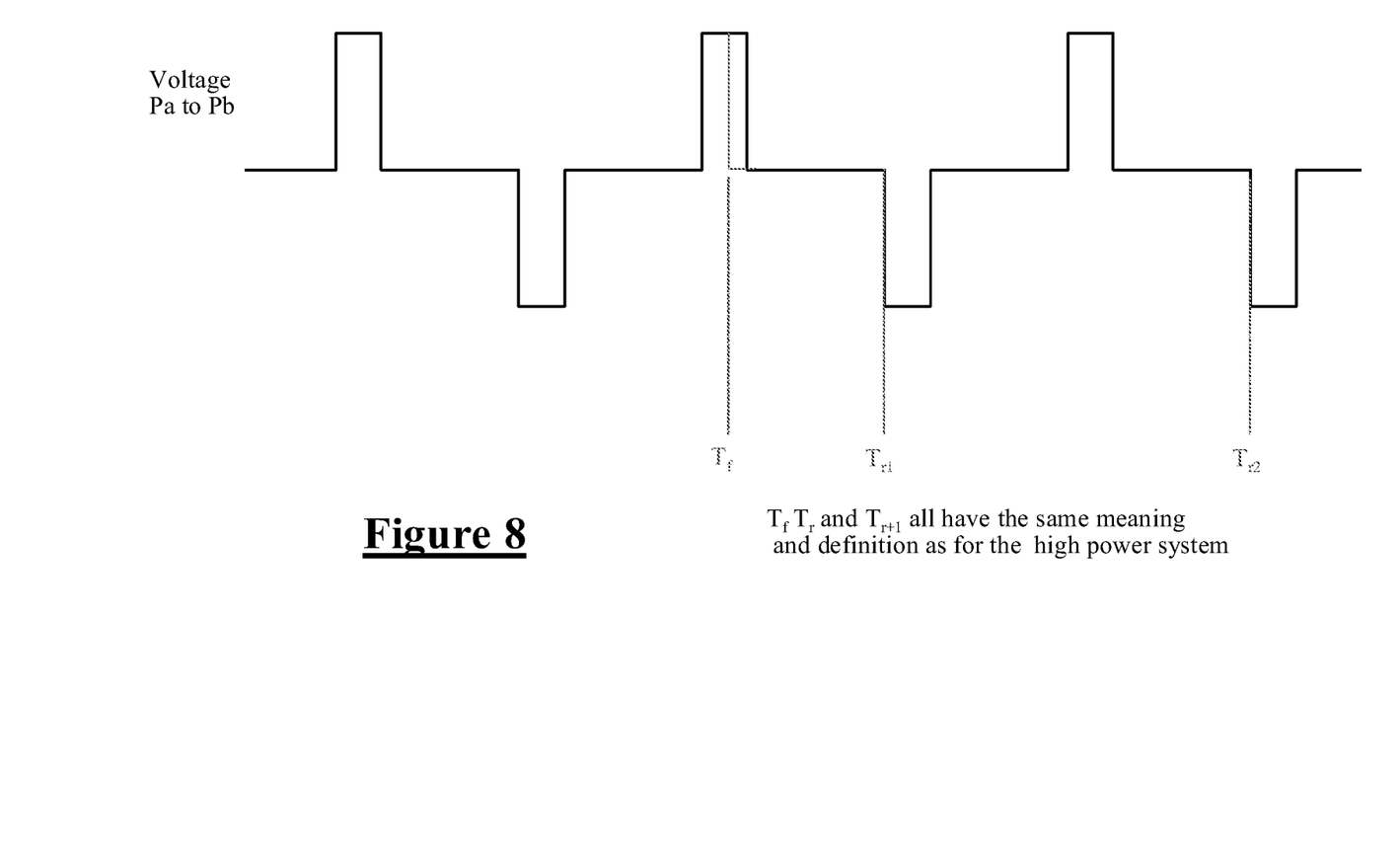
FIG. 8 shows traces of waveforms generated between two outputs of a single phase output from the second SMPS, showing recovery from arcing of a magnetron using a power supply according to the invention.

The attendant waveform from SMPS2 terminals Pa to Pb of the low-power embodiment of FIG. 4b is far simpler than the 3-phase version of FIG. 4a and is shown in FIG. 8 and the behaviour under load fault conditions is also shown in the same Figure.

For a low-power system a typical set of values for an application would be a C1 voltage 400V for a magnetron operating at 2 kV at 0.15 A peak for around 200 W of peak RF output. The duty cycle would be 25% for 50 W average output power. Operating frequency for SMPS1 is preferably 100,000 pps and for SMPS2 preferably 50,000 pps.

Thus this application is concerned particularly with very high-power equipment, which requires a three phase mains supply as would generally be used only in an industrial environment. However, application of the techniques at lower power has also been discussed. The RF generator could be a magnetron or a high-power vacuum tube such as a triode to tetrode, but is not restricted to these devices. The invention uses pulse modulated techniques to produced RF energy with any required degree of peak to average ratio (typically no more than 50:1). A key feature of the arrangement is a very low stored energy in the system so that any voltage breakdown causes very little damage and the process can recover very rapidly if required.

The concept is to use two individual switched mode power supplies (SMPS), intimately linked in series by a DC bus. The first SMPS connects to a prime power input and maintains a high power factor with low harmonic content while setting the magnetron operating voltage and peak current levels. The second SMPS feeds a step up transformer, single or 3-phase, and operates with a variable duty cycle and/or variable frequency to provide average power control. Rectified output is fed directly to the load tube (a magnetron is considered in the detailed description) without filtering. Should the tube arc, the second SMPS can shut down very rapidly and restart on the next cycle, thus minimising process shut down time. The way the two SMPS units are controlled, and the use of rectification without any filter or smoothing components are new.

In a modern electronics system connected to a mains utility an issue is to optimise a wide variety of parameters. For the second SMPS bridge that has to have a wide variety of settings for the load device, holding its input constant is helpful in optimising its output performance. Similarly optimising the first SMPS to cope with mains power inequalities, keeping its output constant is also helpful. With an output of the first SMPS acting as an input to the second SMPS, an intermediate point between the first SMPS and the second SMPS is a stable reference and operating point for each of the SMPS units. The connection between SMPS1 and SMPS2 has a capacitor which supplies pulse energy required for the second SMPS and acts as a smoothing capacitor for the first SMPS1. This arrangement overcomes the fact that taking pulses of current from the mains is forbidden under nearly all countries' electrical utility rules.

The invention claimed is:

1. A power supply for an RF generator, the power supply comprising: a first switched mode power supply (SMPS), and a second SMPS connected in series to the first SMPS by a DC bus including a capacitor connected between outputs of the first SMPS and between inputs of the second SMPS, the outputs of the second SMPS being connected to an input of a step-up transformer, an output of the step-up transformer being connected to an input of a rectifier and an output of the rectifier being connectable to the RF generator, wherein an input of the first SMPS is connectable to a prime power input to set an operating voltage and peak current level for the RF generator and the second SMPS is arranged to feed the step-up transformer and to operate with a variable duty cycle and/or variable frequency to provide average power control of the RF generator wherein an output of the rectifier is connected to the RF generator without filtering or smoothing therebetween so that only minimal energy is stored by the power supply such that the second SMPS can be rapidly switched off.

2. A power supply as claimed in claim 1, wherein the second SMPS can be switched off in less than two microseconds.

3. A power supply as claimed in claim 1, further comprising a controller arranged to monitor a current passing through the RF generator and to control the first and second SMPS.

4. A power supply as claimed in claim 3, wherein the controller is arranged to switch off the second SMPS on detection by the controller of a power surge through the RF generator and subsequently to switch on the second SMPS.

5. A power supply as claimed in claim 3, wherein the controller provides amplitude control and duty cycle control.

6. A power supply as claimed in claim 3, further comprising a contactor to switch the prime power input to the first SMPS, wherein the contactor is arranged to be controlled by the controller.

7. A power supply as claimed in claim 1, having a power factor of at least 0.98.

8. A power supply as claimed in claim 1, arranged to result in harmonic distortion of the prime power input of less than 4%.

9. A power supply as claimed in claim 1, arranged to supply a magnetron RF generator and comprising a heater supply to power a heater of the magnetron, and a controller arranged to control the heater supply.

10. A power supply as claimed in claim 1, further comprising a magnetic field generator to apply a magnetic field to the RF generator, and a controller arranged to control the magnetic field generator.

11. A power supply as claimed in claim 1, arranged for a three-phase prime power input.

12. A power supply as claimed in claim 1, arranged to operate with a peak to mean power ratio in a range of 1 to 100.

* * * * *